US010075630B2

(12) United States Patent
Vartanian et al.

(10) Patent No.: US 10,075,630 B2
(45) Date of Patent: Sep. 11, 2018

(54) PROVIDING REAL-TIME, PERSONAL SERVICES BY ACCESSING COMPONENTS ON A MOBILE DEVICE

(71) Applicant: HJ Laboratories, LLC, Philadelphia, PA (US)

(72) Inventors: Harry Vartanian, Philadelphia, PA (US); Jaron Jurikson-Rhodes, Philadelphia, PA (US)

(73) Assignee: HJ Laboratories, LLC, Bryn Mawr, PA (US)

( * ) Notice: Subject to any disclaimer, the term of this patent is extended or adjusted under 35 U.S.C. 154(b) by 804 days.

(21) Appl. No.: 13/935,480

(22) Filed: Jul. 3, 2013

(65) Prior Publication Data

US 2015/0009348 A1    Jan. 8, 2015

(51) Int. Cl.
*H04N 5/232* (2006.01)
*H04N 7/18* (2006.01)

(52) U.S. Cl.
CPC ..... *H04N 5/23222* (2013.01); *H04N 5/23206* (2013.01); *H04N 5/23216* (2013.01); *H04N 5/23293* (2013.01); *H04N 7/183* (2013.01)

(58) Field of Classification Search
CPC ........... H04N 5/23222; H04N 5/23216; H04N 5/23293; H04N 7/183; H04N 5/23206
See application file for complete search history.

(56) References Cited

U.S. PATENT DOCUMENTS

| | | | |
|---|---|---|---|
| 5,882,206 A | 3/1999 | Gillio | |
| 6,307,570 B1 | 10/2001 | Stergiades | |
| 6,343,311 B1 | 1/2002 | Nishida et al. | |
| 6,587,125 B1 | 7/2003 | Paroz | |
| 7,027,311 B2 | 4/2006 | Vanderelli et al. | |
| 7,050,835 B2 | 5/2006 | Hack et al. | |
| 7,680,661 B2 | 3/2010 | Co et al. | |
| 8,166,421 B2 | 4/2012 | Magal et al. | |
| 8,170,609 B2 | 5/2012 | Hedtke et al. | |
| 8,219,397 B2 | 7/2012 | Jaiswal et al. | |
| 8,290,907 B2 | 10/2012 | Collins | |

(Continued)

FOREIGN PATENT DOCUMENTS

| | | |
|---|---|---|
| KR | 101032978 B1 | 5/2011 |
| WO | 2007012899 A1 | 2/2007 |
| WO | 12011044 A1 | 1/2012 |

OTHER PUBLICATIONS

International Telecommunication Union, "ITU-T H.263, Series H: Audiovisual and Multimedia Systems, Infrastructure of audiovisual services—Coding of moving video, Video coding for low bit rate communication" ITU-T Recommendation H.263 (Jan. 2005).

(Continued)

*Primary Examiner* — Albert Cutler

(74) *Attorney, Agent, or Firm* — Volpe and Koenig, P.C.

(57) ABSTRACT

A mobile electronic device may request for assistance with taking a photo by a remote camera service component on a remote device. Selective shared control may be facilitated for sensor components of the mobile electronic device to adjust components for taking the photo. The photo may be taken from the remote camera service component based on a shared view of objects in the photo and the selective shared control may expire after taking the photo.

4 Claims, 7 Drawing Sheets

(56) References Cited

U.S. PATENT DOCUMENTS

| | | |
|---|---|---|
| 8,601,506 B2 | 12/2013 | Harwell et al. |
| 8,743,244 B2 | 6/2014 | Vartanian et al. |
| 8,774,932 B2 | 7/2014 | Fahey |
| 8,821,417 B2 | 9/2014 | McGregor et al. |
| 9,011,326 B2 | 4/2015 | Hannaford et al. |
| 9,101,279 B2 | 8/2015 | Ritchey et al. |
| 9,578,200 B2 | 2/2017 | Vartanian et al. |
| 2003/0217037 A1 | 11/2003 | Bicker et al. |
| 2006/0096392 A1 | 5/2006 | Inkster et al. |
| 2007/0085838 A1 | 4/2007 | Ricks et al. |
| 2007/0139391 A1 | 6/2007 | Bischoff |
| 2007/0247422 A1 | 10/2007 | Vertegaal et al. |
| 2009/0181642 A1 | 7/2009 | Bekanich |
| 2010/0201811 A1 | 8/2010 | Garcia et al. |
| 2011/0019073 A1* | 1/2011 | Naimark ............ H04N 5/232 348/370 |
| 2011/0025827 A1 | 2/2011 | Shpunt et al. |
| 2011/0050909 A1* | 3/2011 | Ellenby ............ G03B 17/24 348/207.1 |
| 2011/0096182 A1 | 4/2011 | Cohen et al. |
| 2011/0110594 A1 | 5/2011 | Hasegawa et al. |
| 2011/0159962 A1 | 6/2011 | Yerli |
| 2011/0188054 A1 | 8/2011 | Petronius et al. |
| 2011/0199342 A1 | 8/2011 | Vartanian et al. |
| 2011/0211044 A1 | 9/2011 | Shpunt et al. |
| 2011/0245633 A1 | 10/2011 | Goldberg et al. |
| 2012/0050488 A1 | 3/2012 | Cohen et al. |
| 2012/0092277 A1 | 4/2012 | Momchilov |
| 2012/0102552 A1 | 4/2012 | Sammon et al. |
| 2012/0166257 A1 | 6/2012 | Shiragami et al. |
| 2012/0215543 A1 | 8/2012 | Oz et al. |
| 2012/0259652 A1 | 10/2012 | Mallon et al. |
| 2012/0290299 A1 | 11/2012 | Basson et al. |
| 2012/0321131 A1* | 12/2012 | Kobayashi ......... H04N 1/00183 382/103 |
| 2013/0050507 A1* | 2/2013 | Syed ............... H04N 1/00137 348/207.1 |
| 2013/0060489 A1 | 3/2013 | Crossman et al. |
| 2013/0076918 A1* | 3/2013 | Park ............... H04N 1/00251 348/207.11 |
| 2013/0096915 A1 | 4/2013 | Rennie et al. |
| 2013/0111362 A1 | 5/2013 | Alexandrov et al. |
| 2014/0168073 A1 | 6/2014 | Chizeck et al. |
| 2015/0138396 A1* | 5/2015 | Sako ............... H04N 5/23216 348/231.6 |

OTHER PUBLICATIONS

International Telecommunication Union, "ITU-T H.264, Series H: Audiovisual and Multimedia Systems, Infrastructure of audiovisual services—Coding of moving video, Advanced video coding for generic audiovisual services," ITU-T Recommendation H.264 (Apr. 2013).

* cited by examiner

PROVIDING REAL-TIME, PERSONAL SERVICES BY ACCESSING COMPONENTS ON A MOBILE DEVICE

TECHNICAL FIELD

This application is related to providing real-time or almost real-time personal services by remotely accessing or controlling components on electronic devices. Other enhancements to electronic devices are also given herewith.

BACKGROUND

Electronic devices such as tablets, mobile devices, cellular phones, personal digital assistants, smartphones, tablet personal computers (PCs), laptop computers, notebook computers, televisions, digital picture frames, large displays, smart watches, wearable computers, optical head-mounted displays (OHMDs), or the like continue to increase productivity for services where the human element/tasks may be automated. However, a large amount of personal services (e.g. photographers, personal trainers, plumbers, electricians, repairmen, technical support, in-home services, mechanic, security guard, body guard, etc.) lack automation. This may partly be due to the need for human or a hands-on element/intelligence to providing certain tasks of these services that artificial intelligence cannot yet provide.

Therefore, it is desirable to have better integration between electronic devices and personal services in order to increase productivity, quality, speed, customer satisfaction, and the overall user experience.

SUMMARY

An apparatus, method, or system for providing real-time or almost real-time personal services by accessing, controlling, or using components on electronic devices is disclosed. Access or control may be given to human personal service providers to an electronic device so that certain tasks or jobs may be performed remotely by using components on the electronic device.

BRIEF DESCRIPTION OF THE DRAWINGS

A more detailed understanding may be had from the following description, given by way of example in conjunction with the accompanying drawings wherein.

DETAILED DESCRIPTION

Figure 1:
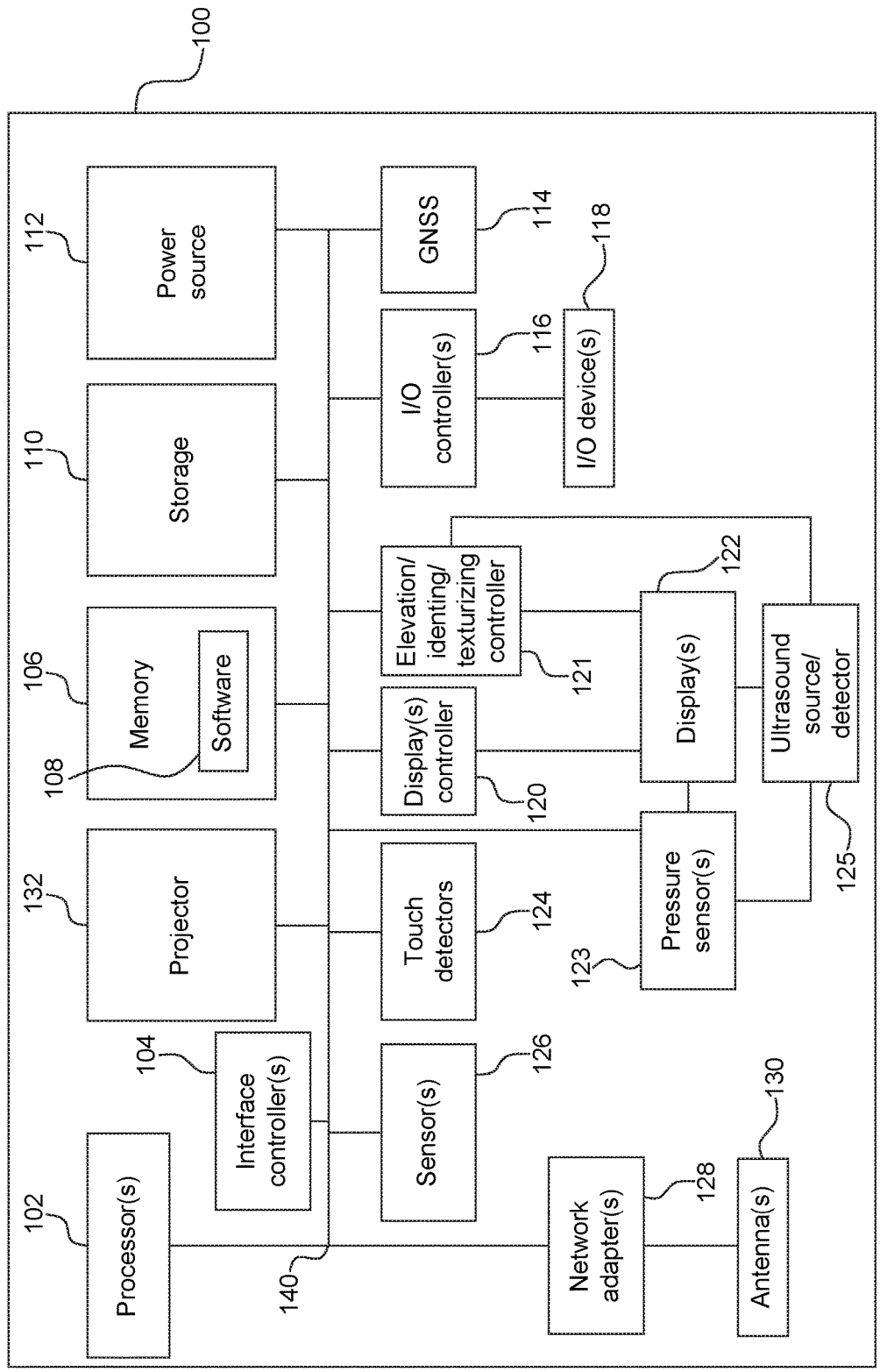
FIG. 1 is a diagram of an object device or electronic device.

Examples will be described with reference to the drawing figures wherein like numerals represent like elements throughout. For the methods and processes described below the steps recited may be performed out of sequence in any order and sub-steps not explicitly described or shown may be performed. In addition, "coupled" or "operatively coupled" may mean that objects are linked between zero or more intermediate objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

FIG. 1 is a diagram of an object device, or electronic device, 100 that may be configured as a wireless subscriber unit, mobile device, user equipment (UE), mobile station, smartphone, pager, mobile computer, cellular phone, cellular telephone, telephone, personal digital assistant (PDA), computing device, surface computer, tablet, tablet computer, sensor, machine, monitor, general display, versatile device, digital picture frame, appliance, automobile computer system, television device, home appliance, home computer system, laptop, netbook, personal computer (PC), an Internet pad, digital music player, peripheral, add-on, an attachment, virtual reality glasses, media player, video game device, head-mounted display (HMD), helmet mounted display (HMD), glasses, goggles, wearable computer, wearable headset computer, optical head-mounted display (OHMD), or any other electronic device for mobile or fixed applications.

Object device 100 comprises computer bus 140 that couples one or more processors 102, one or more interface controllers 104, memory 106 having software 108, storage device 110, power source 112, and/or one or more displays controller 120. In addition, object device 100 may comprise an elevation, indenting, or texturizing controller 121 to provide sensations to an object or person located near one or more display devices 122.

One or more display devices 122 can be configured as a plasma, liquid crystal display (LCD), light emitting diode (LED), field emission display (FED), surface-conduction electron-emitter display (SED), organic light emitting diode (OLED), flexible OLED, or any other display device. The one or more display devices 122 may be configured, manufactured, produced, or assembled based on the descriptions provided in U.S. Patent Publication Nos. 2007-0247422, 2007-0139391, 2007-0085838, or 2006-0096392 or U.S. Pat. No. 7,050,835 or WO Publication No. 2007-012899 all herein incorporated by reference as if fully set forth. In the case of a flexible or bendable display device, the one or more electronic display devices 122 may be configured and assembled using organic light emitting diodes (OLED), liquid crystal displays using flexible substrate technology, flexible transistors, field emission displays (FED) using flexible substrate technology, or the like.

One or more display devices 122 can be configured as a touch, multi-input touch, multiple input touch, multiple touch, or multi-touch screen display using resistive, capacitive, surface-acoustic wave (SAW) capacitive, infrared, strain gauge, optical imaging, dispersive signal technology, acoustic pulse recognition, frustrated total internal reflection, or magneto-strictive technology, as understood by one of ordinary skill in the art. One or more display devices 122 can also be configured as a three dimensional (3D), electronic paper (e-paper), or electronic ink (e-ink) display device.

Coupled to one or more display devices 122 may be pressure sensors 123. Coupled to computer bus 140 are one or more input/output (I/O) controllers 116, I/O devices 118, global navigation satellite system (GNSS) device 114, one or more network adapters 128, and/or one or more antennas 130. Examples of I/O devices include a speaker, microphone, keyboard, keypad, touchpad, display, touchscreen, wireless gesture device, a digital camera, a digital video recorder, a vibration device, universal serial bus (USB) connection, a USB device, or the like. An example of GNSS is the Global Positioning System (GPS).

Object device 100 may have one or more motion, proximity, light, optical, chemical, biological, medical, environmental, barometric, atmospheric pressure, moisture, acoustic, heat, temperature, metal detector, radio frequency identification (RFID), biometric, face recognition, facial recognition, image, infrared, camera, photo, or voice recognition sensor(s) 126. Examples of image, photo, text, or character recognition engines are provided by U.S. Patent Publication Nos. 2011-0110594 or 2012-0102552 all herein incorporated by reference as if fully set forth.

One or more sensors 126 may also be an accelerometer, an electronic compass (e-compass), a gyroscope, a 3D gyroscope, a 3D accelerometer, a 4D gyroscope, a 4D accelerometer, or the like. One or more sensors 126 may operate with respective software engines/components in software 108 to interpret/discern/process detected measurements, signals, fields, stimuli, inputs, or the like.

Object device 100 may also have touch detectors 124 for detecting any touch inputs, multi-input touch inputs, multiple input touch inputs, multiple touch inputs, or multi-touch inputs for one or more display devices 122. One or more interface controllers 104 may communicate with touch detectors 124 and I/O controllers 116 for determining user inputs to object device 100. Coupled to one or more display devices 122 may be pressure sensors 123 for detecting presses on one or more display devices 122. In another example, touch detectors 124 and/or pressure sensors 123 may be integrated into one or more display devices 122 to determine any user gestures or inputs.

Ultrasound source/detector 125 may be configured in combination with touch detectors 124, elevation, indenting, or texturizing controller 121, one or more display devices 122, pressure sensors 123, or sensors 126 to project or generate ultrasound waves, rays, or beams to an object to simulate elevated, indented, or texturized sensations, recognize inputs, or track the object. U.S. Patent Publication No. 2011-0199342 is herein incorporated by reference as if fully set forth and may be used in combination with the given examples to provide a display device that may adaptively emit ultrasound, ultrasonic, acoustic, or radio waves to provide an elevated, indented, or texturized sensation to an object, or person near a display device. There may be cases for input recognition or object tracking wherein an ultrasound is provided without detected sensation to the object.

Still referring to object device 100, storage device 110 may be any disk based or solid state memory device for storing data. Power source 112 may be a plug-in, battery, solar panels for receiving and storing solar energy, or a device for receiving and storing wireless power as described in U.S. Pat. No. 7,027,311 herein incorporated by reference as if fully set forth.

One or more network adapters 128 may be configured as a Frequency Division Multiple Access (FDMA), single carrier FDMA (SC-FDMA), Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Interim Standard 95 (IS-95), IS-856, Enhanced Data rates for GSM Evolution (EDGE), General Packet Radio Service (GPRS), Universal Mobile Telecommunications System (UMTS), cdma2000, wideband CDMA (W-CDMA), High-Speed Downlink Packet Access (HSDPA), High-Speed Uplink Packet Access (HSUPA), High-Speed Packet Access (HSPA), Evolved HSPA (HSPA+), Long Term Evolution (LTE), LTE Advanced (LTE-A), 802.11x, Wi-Fi, Zigbee, Ultra-WideBand (UWB), 802.16x, 802.15, Wi-Max, mobile Wi-Max, home Node-B (HnB), Bluetooth, radio frequency identification (RFID), Infrared Data Association (IrDA), near-field communications (NFC), fifth generation (5G), or any other wireless or wired device/transceiver for communication via one or more antennas 130.

One or more network adapters 128 may also be configured for automobile to automobile, car to car, vehicle to vehicle (V2V), or wireless access for vehicular environments (WAVE) communication. One or more network adapters 128 may also be configured for human body communications where the human body is used to communicate data between at least two computers coupled to the human body. In addition, any of the communication links referenced herewith may be wired or wireless or both wired and wireless.

Any of devices, controllers, displays, components, etc. in object device 100 may be combined, made integral, or separated as desired. For instance, elevation, indenting, or texturizing controller 121 may be combined with ultrasound source/detector 125 in one unit.

Figure 2A:
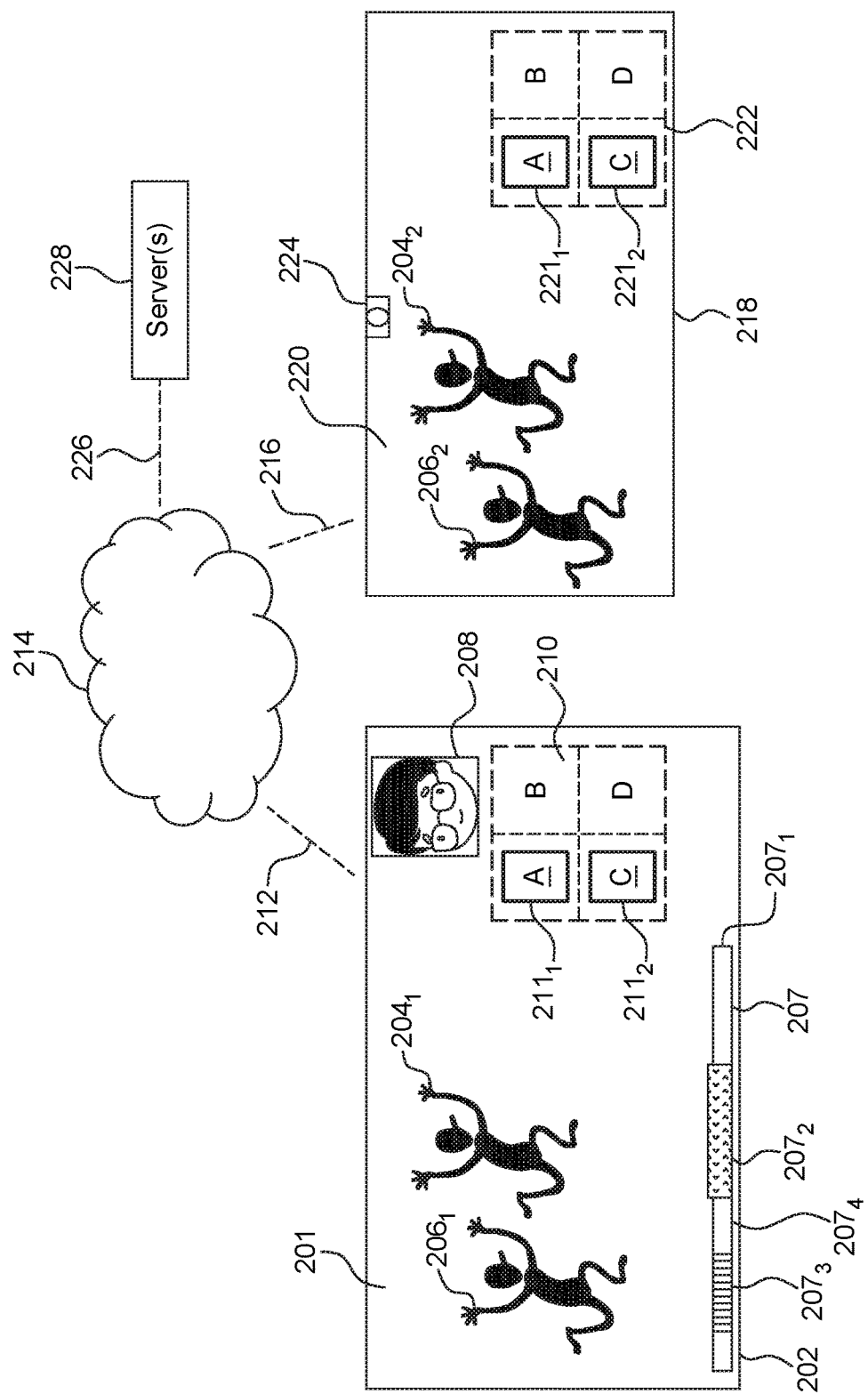
FIG. 2A is a diagram showing an example of remotely providing professional or personal services.

FIG. 2A is a diagram showing an example of remotely providing professional or personal services. Device 202 or 218 may be configured with some or all of the components of object device 100. Device 202 or 218 may also be configured as object device 100. In FIG. 2A, device 202 may be configured to allow control, partial control, limited control, remote control, assisted control, user assisted control, access, partial access, limited access, remote access, assisted access, user assisted access, or the like of certain software or hardware components on device 202 to provide professional or personal services. In the examples forthcoming, a user may be a human and the terms may be used interchangeably.

Prior to giving or establishing any control or access, devices 202 and 218 may perform a security procedure. During the security procedure, authentication may be performed and/or the communication may be encrypted between devices 202 and 218. Moreover, the components and levels of control for different components may be setup or defined during the security procedure. For instance, device 218 may have administrator type rights to certain components while having use only rights to other components. A key exchange, such as Diffie-Hellman (D-H) key exchange or public key infrastructure (PKI), may also be performed during the security procedure.

User assisted control or user assisted access may mean that a user of device 202 (or device 202 itself) collaborates, coordinates, or works with a user of device 218 (or device 218 itself) by allowing selective control/access to software or hardware components on device 202. Selective control or access may be real-time, almost real-time, time limited, task limited, project limited, session limited, connection limited, or the like. In addition, a plurality of users, a team of users, a crowdsourced collection of users, or a group of users may collaborate to control device 202 to provide professional or personal services. For this setup, there may be multiple devices 218 that each collectively interface with device 202 over network 214. The user(s) of device 218 (or device 218 itself) may be outsourced and located in another state, region, or country relative to device 202.

Moreover the user of device 218 or device 218 may be put on stand-by, hold, or pause when device 202 does not desire the personal or professional services. This is similar to providing on-demand like assisted personal services by device 218 to device 202. As an example, services between device 202 and 218 may be put on stand-by, hold, or pause for minutes, hours, days, weeks, months, etc. When the service is restarted, the project or task may continue from the point it was previously stopped thereby providing service continuity.

Putting device 218 in a stand-by, a hold, or a pause state may be performed by device 202 by sending a message over network 214, such as by transmission control protocol (TCP), internet protocol (IP), short message service (SMS), multimedia messaging service (MMS), electronic mail (email), or the like. The message may be sent to device 218 directly by device 202. Alternatively, the message may be sent to one or more servers 228 that communicate with device 218 to coordinate, facilitate, or manage the control/access to components on device 202. In another example, one or more servers 228 may simply be a pipe where messages flow between device 202 and device 218. When device 202 is in a stand-by, a hold, or a pause state, device 218 may provide personal or professional services to other devices configured similar to device 202.

From another viewpoint, device 202 may collaborate, coordinate, or work with device 218 by allowing selective control or access to software or hardware components on device 202 to provide professional or personal services. Examples of these services may include photography, assisted point and shoot photography, enhanced point and shoot, videography, education, personal photography, personal videography, enhanced personal photography, enhanced personal videography, individual photography, individual videography, crowdsourced photography, crowdsourced videography, meeting management, WebEx™ meeting management, WebEx™ meeting optimization, personal decorating, personal (physical) trainer, individual trainer, crowdsourced trainer, personal concierge, personal tour guide, individual concierge, crowdsourced concierge, social network manager, personal social network manager, individual social network manager, crowdsourced social network manager, live personal assistant, individual personal assistant, user assisted telepresence, user augmented telepresence, enhanced remote services, coaching, personal coaching, teaching, personal tutor, personal film producer, personal film director, personal help desk, personal negotiating, personal sales assistant, personal consumer electronics teacher, personal driving instructor, human assisted tutorial service, human assistance to Apple™ Computer's Siri™, personal bodyguard, personal life coach, personal work coach, personal career coach, personal identification by a remote human, remote security checkpoint, remote security scan, or the like.

Moreover, the following is an exemplary, non-inclusive list of software or hardware components on device 202 that may be selectively controlled or accessed by device 218. Examples of components may include storage device 110, power source 112, I/O controllers 116, I/O devices 118, one or more sensors 126, network adapters 128, projector 132, or the like. When the component is a sensor it may include one or more motion, proximity, light, optical, chemical, biological, medical, environmental, barometric, atmospheric pressure, moisture, acoustic, heat, metal detector, temperature, radio frequency identification (RFID), biometric, face recognition, facial recognition, image, photo, or voice recognition sensor(s) 126.

Software or hardware components may also include an accelerometer, an electronic compass (e-compass), a gyroscope, a 3D gyroscope, a 3D accelerometer, a 4D gyroscope, a 4D accelerometer, or the like. As mentioned above, one or more sensors 126 may operate with respective software engines/components in software 108 to interpret/discern/process detected measurements, signals, stimuli, input, or the like. Any of the exemplary components, sensors, devices, or the like listed may be implemented in hardware and/or software when possible.

Referring again to FIG. 2A, device 202 may be configured, such as by a user or during manufacturing, to allow a professional photographer to remote control components on device 202 with device 218. This configuration may be considered as providing a human assisted, remote, personal photographer or videographer to a user of device 202 and/or device 202. This configuration may also be considered as providing human assisted, point and shoot photography or videography to a user of device 202 and/or device 202. As explained below, real-time editing of photos or videos may be provided by a human to another user via devices 202 and 218.

Device 202 may have within viewing area 201 images or objects $204_1$ and $206_1$ shown that are being captured by a camera or sensor(s) on device 202. The sensor on device 202 to capture/model images or objects $204_1$ and $206_1$ may be one or more motion, proximity, light, optical, acoustic, heat, temperature, radio frequency identification (RFID), image, infrared, camera, photo sensors, or the like.

Viewing area 201 may be displayed by one or more display devices 122. Within viewing area 201 may exist displayed components area 210 with components A, B, C, D. Components A, B, C, D may represent what components may be given access to remotely control by a photographer via device 218. Although four components are shown in components area 210, components area 210 may have any number of components. In addition, video chat or feed 208 may be shown on device 202 live while providing professional or personal services. Video chat or feed 208 may also be recorded or a delayed.

Communication between devices 202 or 218 may be provided over wired or wireless links 212 and 216 via network 214. In addition, one or more servers 228 may coordinate personal or professional services between devices 202 or 218. One or more servers 228 may provide coordination over wired or wireless links 226. As an example, coordination may be provided by a web or cloud service engine operating on one or more servers 228. Wired or wireless links 212, 216, or 226 may be setup using one or more network adapters 128. When setup using one or more network adapters 128 any of the technologies given above may be configured.

Alternatively, one or more servers 228 may facilitate or manage the control or access to components on device 202. In another example, one or more servers 228 may simply be a pipe where messages flow between device 202 and device 218.

Viewing area 220 may be displayed by one or more display devices 122. Within viewing area 220 may exist components area 222 with components A, B, C, D. Components A, B, C, D may represent what components on device 202 may be given access to remotely control by a photographer on device 218 via adjustments to corresponding components area 222.

Using image capture device 224, such as a camera, video chat or video feed 208 may be shown on device 202 while providing professional or personal services. While a photography session is in progress, display bar 207 may show the live video chat or video feed being streamed or downloaded. In the video chat or video feed a photographer may give the user directions on how to hold, position, or operate device 202 prior to taking a photo. The photographer may provide directions or feedback based on value or data from any one of components A-D on device 202 provided to device 218.

Segment indicators $207_2$, $207_3$, or $207_4$ may display different codec types or qualities used for different segments of the streamed or downloaded video. Segment indicators $207_2$, $207_3$, or $207_4$ may also indicate codecs used at different time instances to provide live video or chat feed 208. Different colors or textures may be used to distinguish between segment indicators $207_2$, $207_3$, or $207_4$.

Examples of different codec types may include H.264, advanced video coding (AVC), H.263, MPEG-X (1-2-4), or the like. Examples of different codec qualities may include different codec profiles, coding rates, bit rates (e.g. 320 kbps, 2000 kbps, 5000 kbps, 10000 kbps, 20000 kbps, etc.), references, resolutions, scalability options, compression rates, frame rates (e.g. 24, 25, 30, etc.), scan types, sample rates, or the like.

As an example, segment indicator $207_4$ may represent the highest available codec type or quality used for a segment communicated between devices 202 and 218. Segment indicator $207_3$ may represent a medium quality codec type or quality used for a segment communicated between devices 202 and 218. Segment indicator $207_2$ may represent the lowest quality codec type or quality used for a segment communicated between devices 202 and 218.

Moreover, upgrades in real-time to segments indicated by $207_2$ or $207_3$ may be available or possible. For instance, a buffer on device 202 or one or more servers 228 may store the segments related to $207_2$ or $207_3$ for improved replay later by enhancing or upgrading the segments. The enhancement or upgrade may be performed in the background on device 202 or one or more servers 228.

An enhancement or upgrade may be performed, for example, by attempting to repair packets, frames, macroblocks, or motion vectors in segments related to $207_2$ or $207_3$ within the framework of the codec used for the segments (e.g. H.264). Packets or frames may be repaired using advanced error correction or decoding schemes/algorithms that could not have been performed in real-time when video frames were received by device 202. Packets or frames may also be repaired by performing retransmissions of the data/frame/packets that could have not have been done in real-time when video frames were received by device 202.

A repaired or retransmitted high quality frame may replace its corresponding low quality frame in segments related to $207_2$ or $207_3$ and reassembled with the segment related to $207_4$ for later playback of the recorded live feed or video chat 208. If an enhancement or repair is unsuccessful, segments may be repeated at current time point $207_1$. This may provide asynchronous streaming or video conferencing/chat.

A repair or enhancement of a segment, for instance, may be initiated by selecting and dragging segment indicator $207_3$ to segment indicator $207_4$ or vice versa. For this operation, the medium quality video of the segment related to $207_3$ may be enhanced to the highest available video quality of the segment indicated by $207_4$. Also, as an example a selection may be made by a touch, hold, and drag gesture received by device 202 to indicator $207_3$ over to indicator $207_4$.

In the example of a personal photographer, component A in components area 222 may allow control or access to an image stabilization component on device 202 by device 218. Also as an example, component B in components area 222 may allow control or access to a flash component on device 202 by device 218. Also as an example, component C in components area 222 may allow control or access to a shooting mode component on device 202 by device 218. Also as an example, component D in components area 222 may allow control or access to a shutter speed or aperture component on device 202 by device 218. In the case of photography or videography, other examples for components A-D may be focus, zoom, tilt, special effects, red eye reduction, real-time editing, or the like.

Control or access of components A or C may be provided by software engines running on devices 202 and/or 218. Parts of the software engine may also run on one or more servers 228. Control or access of components A or C may need access to certain components, such as drivers, of the operating systems on devices 202 and/or 218. Engines working with operating systems for remote control of an electronic device are described in U.S. Patent Publication Nos. 2013-0111362 and 2012-0092277 and U.S. Pat. Nos. 6,343,311, 6,307,570, 6,587,125, and 8,290,907 all herein incorporated by reference as if fully set forth.

Device 218 may have within viewing area 220 views of images or objects $204_2$ and $206_2$ that display the movement of images or objects $204_1$ and $206_1$. Images or objects $204_1$ and $206_1$ may be moving and/or device 202 may be moving substantially simultaneously. When device 202 is ready to take a picture of images or objects $204_1$ and $206_1$ control or access may be given to components A and C to device 218, such as via a request or message over network 214.

Control or access may be selectively given in real-time to device 218 by detected inputs to areas $211_1$ or $211_2$ before, after, or during a request is made for personal or professional services. An input may to be a touch input, a touch gesture, a gesture, a multi-touch input, a voice recognition input, a speech recognition input, a motion based input, or the like. Tracking or gesture detection engines or systems are given by U.S. Patent Publication Nos. 2010-0201811, 2011-0025827, 2011-0096182, 2011-0188054, 2011-0211044, 2011-0188054, 2012-0050488, U.S. Pat. No. 8,166,421, and PCT Publication No. WO 12/011,044 all herein incorporated by reference as if fully set forth.

For a motion based input, an accelerometer or gyroscope on device 202 may be used to feed data to a motion recognition engine running on memory on device 202. A detected input may result in highlighting of areas $211_1$ or $211_2$ or underlining of components A or C. Areas $221_1$ or $221_2$ of components A or C may correspondingly be highlighted or underlined to indicate controls or access given to device 218. This may be performed by sending an update message to device 218 by device 202 via network 214.

In addition, access or control may be given to device 202 by sending a message over network 214, such as by transmission control protocol (TCP), internet protocol (IP), short message service (SMS), multimedia messaging service (MMS), electronic mail (email), or the like. The message may be sent to device 218 directly by device 202. Alternatively, the message may be sent to one or more servers 228 that communicate with device 218 to coordinate, facilitate, or manage the control or access to components on device 202. In another example, one or more servers 228 may simply be a pipe where messages flow between device 202 and device 218.

Once access or control is established between the devices, components A or C are adjusted to take high quality photos of images or objects $204_1$ or $206_1$ by a user of device 218 and/or device 218. Adjustments may be selectively made in real-time to device 202 by detected inputs to areas $221_1$ or $221_2$. An input may be a touch input, a touch gesture, a gesture, a multi-touch input, a voice recognition input, a speech recognition input, or a motion based input. Tracking or gesture detection engines or systems are given by U.S. Patent Publication Nos. 2010-0201811, 2011-0025827, 2011-0096182, 2011-0188054, 2011-0211044, 2011-0188054, 2012-0050488, U.S. Pat. No. 8,166,421, and PCT Publication No. WO 12/011,044 all herein incorporated by reference as if fully set forth.

For a motion based input, an accelerometer or gyroscope on device 218 may be used to feed data to a motion recognition engine running on memory on device 218.

Moreover, as an example for component A, a touch input may be a drag or slide over areas $221_1$ or $221_2$ that adjusts component A by applying different image stabilization algorithms in real-time on device 202 until an optimal one is found by a user on device 218 or device 218. The optimal image stabilization algorithm may be one that brings images or objects $204_2$ or $206_2$ in conformance with a user profile or user settings for device 202. The user profile or user settings may be stored on device 202 and/or on one or more servers 228.

Moreover different image stabilization algorithms may be applied substantially simultaneously by device 218 to images or object $204_2$ versus image or object $206_2$. Images or objects $204_1$ or $206_1$ on device 202 may stay constant or unchanged while adjustments, filtering, or optimizations are made to images or objects $204_2$ or $206_2$.

A user of device 218 and/or device 218 may also adjust component C. Adjustments, filters, or optimizations may be performed by applying different shooting modes in real-time on device 202 until an optimal one is found by a user on device 218 or device 218. The optimal shooting mode may be one that brings images or objects $204_2$ or $206_2$ in alignment with a user profile or user settings for device 202. The user profile or user settings may be stored on device 202 or on one or more servers 228.

Moreover different shooting modes may be applied substantially simultaneously by device 218 to image or objects $204_2$ versus image or objects $206_2$. For instance, a shooting mode for low light conditions may be applied to image or objects $204_2$ while a shooting mode to capture the best quality face may be applied to image or objects $206_2$. Images or objects $204_1$ or $206_1$ on device 202 may stay constant or unchanged while adjustments, filtering, or optimizations are made to corresponding images or objects $204_2$ or $206_2$.

In addition, device 218 may run a scan through different combinations of settings or levels of components A and C. The scan may be run until a user of device 218 or device 218 finds an optimal combination. Once an optimal combination is found, it may be applied to images or objects $204_1$ or $206_1$ for approval by a user of device 202 and/or device 202. An approval may automatically trigger device 202 to capture an image or video of images or objects $204_1$ or $206_1$ by device 202.

Alternatively, an image or video may be taken of images or objects $204_1$ or $206_1$ by device 202 that is initiated by device 218 without approval by a user of device 202 and/or device 202. This may be useful, for example, when device 202 is configured as a headseat, HUD, or Google™ Glass™ and ubiquitous image capture is desired at a special event. Examples of special events may include weddings, birthday parties, parties, graduations, etc. The image or video may subsequently be stored on device 202, device 218, and/or one or more servers 228.

Moreover device 202 may initiate a request for services by sending a message over network 214 to one or more servers 228 where the message explains specifics for a new project or task. Personal or professional services providers may then bid on the project/task or be best matched based on the specifics of the new project or task. The bidding or matching engine may be configured to run on one or servers 228 or peer-to-peer between devices 202 and 218. The task or project may be crowdsourced or assigned by one or servers 228 to multiple personal service or professional service providers.

In the case of a photography project, for example, a junior and a senior photographer may be teamed/matched together to control device 202 to take professional pictures for a user of device 202 at a birthday party for $350. The junior and senior photographer may be matched based on location, user ratings, most competitive bid, or the like to the photography project or task.

Figure 2B:
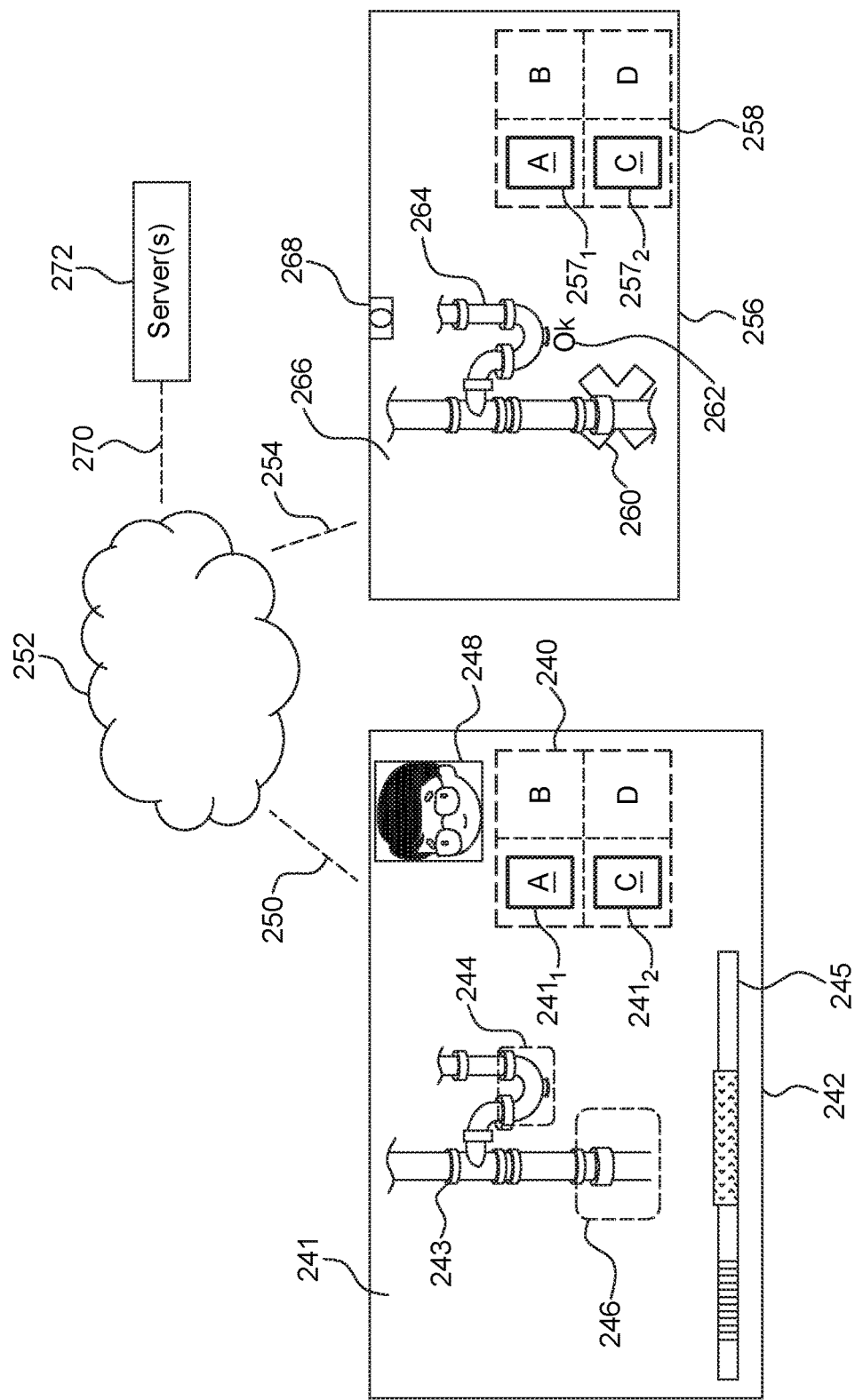
FIG. 2B is a diagram showing an example of remotely providing personal or trade services.

FIG. 2B is a diagram showing an example of remotely providing personal or trade services. Device 242 or 256 may be configured with some or all of the components of object device 100. Device 242 or 256 may also be configured as object device 100. In FIG. 2B, device 242 may be configured to allow control, partial control, limited control, remote control, assisted control, user assisted control, access, partial access, limited access, remote access, assisted access, user assisted access, or the like of certain software or hardware components on device 242 to provide personal or trade services. In the examples forthcoming, a user may be a human and the terms may be used interchangeably.

Prior to giving any control or access, devices 242 and 256 may perform a security protocol. During the security protocol, authentication may be performed and/or the communication may be encrypted between devices 242 and 256. Moreover, the components and levels of control for different components may be setup or defined during the security protocol. For instance, device 256 may have administrator type rights to certain components while having use only rights to other components. A key exchange, such as Diffie-Hellman (D-H) key exchange or public key infrastructure (PKI), may also be performed during the security procedure.

User assisted control or user assisted access may mean that a user of device 242 collaborates, coordinates, or works with a user of device 256 by allowing selective control or access to software or hardware components on device 242. Selective control or access may be real-time, almost real-time, time limited, task limited, project limited, session limited, or the like. In addition, a plurality of users, a team of users, a crowdsourced collection of users, or a group of users may collaborate to control device 242 to provide personal or trade services. For this setup, there may be multiple devices 256 that each collectively interface with device 242 over network 252. The user(s) of device 256 (or device 256) may be outsourced and located in another state, region, or country relative to device 242.

Moreover the user of device 256 or device 256 may be put on stand-by, hold, or pause when device 242 does not need the personal or trade services. This is similar to providing on-demand like assisted personal services by device 256 to device 242. As an example, services between device 242 and 256 may be put on stand-by, hold, or pause for minutes, hours, days, weeks, months, etc. When the service is restarted, the project or task may continue from the point it was previously stopped providing service continuity.

Putting device 256 in a stand-by, a hold, or a pause state may be performed by device 242 by sending a message over network 252, such as by transmission control protocol (TCP), internet protocol (IP), short message service (SMS), multimedia messaging service (MMS), electronic mail (email), or the like. The message may be sent to device 256 directly by device 242. Alternatively, the message may be sent to one or more servers 272 that communicate with device 256 to coordinate, facilitate, or manage the control or access to components on device 242. In another example, one or more servers 272 may simply be a pipe where messages flow between device 242 and device 256. When device 242 is in a stand-by, a hold, or a pause state, device 256 may provide personal or trade services to other devices configured similar to device 242.

From another viewpoint, device 242 may collaborate, coordinate, or work with device 256 by allowing selective control or access to software or hardware components on device 242 to provide personal or trade services. Examples of these services may include providing a personal plumber, a personal electrician, a personal handyman, a personal repairman, a personal contractor, a personal appliance repairman, an assisted do-it-yourself service, a personal mechanic, a personal automobile mechanic, a personal conveyance mechanic, a technician, a personal technician, or the like.

Moreover, the following is an exemplary, non-inclusive list of software or hardware components on device 242 that may be selectively controlled or accessed by device 256. Examples of components may include storage device 110, power source 112, I/O controllers 116, I/O devices 118, one or more sensors 126, network adapters 128, projector 132, or the like. When the component is a sensor it may include one or more motion, proximity, light, optical, chemical, biological, medical, environmental, barometric, atmospheric pressure, moisture, acoustic, heat, metal detector, temperature, radio frequency identification (RFID), biometric, face recognition, facial recognition, image, photo, or voice recognition sensor(s) 126.

Software or hardware components may also include an accelerometer, an electronic compass (e-compass), a gyroscope, a 3D gyroscope, a 3D accelerometer, a 4D gyroscope, a 4D accelerometer, or the like. As mentioned above, one or more sensors 126 may operate with respective software engines/components in software 108 to interpret/discern/process detected measurements, signals, stimuli, input or the like. Any of the exemplary components, sensors, devices, or the like listed may be implemented in hardware and/or software when possible.

Referring again to FIG. 2B, device 242 may be configured, such as by a user or during manufacturing, to allow a plumber to remote control components on device 242 with device 256. This configuration may be considered as providing a human assisted, remote, on-demand, or personal plumber to a user of device 242 and/or device 242.

Device 242 may have within viewing area 241 an image of a pipe or object 243 shown that is being captured by a camera or sensor(s) on device 242. Pipe or object 243 may be a drain, water source, wet line, cold water line, hot water line, or any plumbing related object. The sensor on device 242 to capture/model the image or model of a pipe or object 243 may be one or more motion, proximity, light, optical, acoustic, heat, temperature, radio frequency identification (RFID), image, infrared, camera, photo sensors, or the like.

Viewing area 241 may be displayed on one or more display devices 122. Within viewing area 241 may exist displayed components area 240 with components A, B, C, D. Components A, B, C, D may represent what components may be given access to remotely control by a plumber via device 256. Although four components are shown in components area 240, components area 240 may have any number of components. Video chat or feed 248 may be shown live on device 242 while providing personal or trade services. Video chat or feed 248 may also be recorded or delayed.

Communication between devices 242 or 256 may be provided over wired or wireless links 250 and 254 via network 252. In addition, one or more servers 272 may coordinate trade or personal services between devices 242 or 256. One or more servers 272 may provide coordination over wired or wireless links 270. As an example, coordination may be provided by a web or cloud service engine operating on one or more servers 272. Wired or wireless links 250, 254, or 270 may be setup using one or more network adapters 128. When setup using one or more network adapters 128 any of the technologies given above may be configured.

One or more servers 272 may also facilitate or manage the control or access to components on device 242. In another example, one or more servers 272 may simply be a pipe where messages flow between device 242 and device 256.

Viewing area 266 may be displayed by one or more display devices 122. Within viewing area 266 exists components area 258 with components A, B, C, D. Components A, B, C, D may represent what components may be given access to remotely control by a plumber on device 256 via corresponding components area 258. Using image capture device 268, such as a camera, video chat or video feed 248 may be shown live on device 242 while providing personal or trade services. Video chart or video feed may operate as exampled in FIG. 2A using a display bar 245 indicating segments of lesser quality that may be repaired, upgraded, or enhanced as explained above.

In the example of a plumber, component A in components area 258 may allow control or access to a moisture sensing component on device 242 by device 256. Also as an example, component B in components area 258 may allow control or access to a temperature sensing component on device 242 by device 256. Also as an example, component C in components area 258 may allow control or access to an ultrasonic transducing component on device 242 by device 256. Also as an example, component D in components area 258 may allow control or access to a light or flash component on device 242 by device 256. In the case of plumbing, other examples for components A-D may be a motion sensing component, a chemical sensing component, a biological sensing component, an environmental sensing component, a medical related sensing component, a humidity sensing component, a barometric sensing component, an atmospheric pressure sensing component, a heat sensing component, or the like.

Control or access of components A or C may be provided by software engines running on devices 242 and/or 256. Parts of the software engine may also run on one or more servers 272. Control or access of components A or C may need access to certain components of the operating systems on devices 242 and/or 256. Engines working with operating systems for remote control are described in U.S. Patent Publication Nos. 2013-0111,362 and 2012-0092,277 and U.S. Pat. Nos. 6,343,311, 6,307,570, 6,587,125, and 8,290,907 all herein incorporated by reference as if fully set forth.

Control or access may be selectively given in real-time to device 256 by detected inputs to areas $241_1$ or $241_2$ before, after, or during a request is made for personal or trade services. An input may to be a touch input, a touch gesture, a gesture, a multi-touch input, a voice recognition input, a speech recognition input, a motion based input, or the like. Tracking or gesture detection engines or systems are given by U.S. Patent Publication Nos. 2010-0201811, 2011-0025827, 2011-0096182, 2011-0188054, 2011-0211044, 2011-0188054, 2012-0050488, U.S. Pat. No. 8,166,421, and PCT Publication No. WO 12/011,044 all herein incorporated by reference as if fully set forth.

For a motion based input, an accelerometer or gyroscope on device 242 may be used to feed data to a motion recognition engine running on memory on device 242. A detected input may result in highlighting of areas $241_1$ or $241_2$ or underlining of components A or C. Areas $257_1$ or $257_2$ of components A or C may correspondingly be highlighted or underlined to indicate controls or access given to device 256. This may be performed by sending an update message to device 256 by device 242 via network 252.

In addition, access or control may be given to device 256 by sending a message over network 252, such as by transmission control protocol (TCP), internet protocol (IP), short message service (SMS), multimedia messaging service (MMS), electronic mail (email), or the like. The message may be sent to device 256 directly by device 242. Alternatively, the message may be sent to one or more servers 272 that communicate with device 256 to coordinate, facilitate, or manage the control/access to components on device 242. In another example, one or more servers 272 may simply be a pipe where messages flow between device 242 and device 256.

Once access or control is established between the devices, components A or C may be controlled in order to inspect or examine if pipe or object 243 is working properly. If pipe or object 243 is not working properly, components A or C are controlled in order to determine or diagnosis the problem. A master plumber, or a plumber assisted by a master plumber, may remotely control component A on device 242 via device 256 to sense any moisture on pipe or object 243. Similarly, a plumber may remotely control ultrasonic transducing component C on device 242 via device 256 to sense or detect any cracks in pipe or object 243.

Moreover, as an example for component A, a touch input may be a drag or slide over areas $257_1$ or $257_2$ that adjusts by applying different sensitivity levels of a moisture sensing system on device 242 until a precise reading may be made. The precise reading may then be interpreted, processed, or compared to standardized levels to determine if the level of moisture on pipe or object 243 may be normal. Moreover the moisture levels may be normalized by device 256 for ambient moisture levels detected by one or more sensors 126 on device 242 and reported to device 256.

In order to prevent a false positive, one or more sensors 126 on device 242 may also detect condensation to rule out an actual leak on pipe or object 243. This may be done analyzing a live map of water droplets generated by device 256 using one or more sensors 126 on device 242. The live map may be generated by device 256 in a particular spot, such as area 244. If the live map shows, as an example, the water droplets moving with a certain velocity and in a particular direction, device 256 may conclude that pipe or object 243 has a leak.

A user of device 256, or device 256 itself, may also adjust ultrasonic transducing component C on device 242. Different ultrasound power intensities or frequencies may be tested on pipe or object 243 to determine, detect, or diagnose a problem. A problem may be a crack, leak, microcrack, rust, warping, stress, bending, blockage, or the like. In addition, device 256 may run a scan through different combinations of settings or levels of components A and C. The scan may be run until a user of device 256 or device 256 finds a solution to the problem of pipe or object 243. The scan may also run until no problem is found and pipe or object 243 is given an OK for operating properly.

Moreover device 242 may initiate a request for services by sending a message over network 252 to one or more servers 272 where the message explains specifics for a new project or task. Personal or trade services providers may then bid on the project/task or be best matched based on the specifics of the new project or task. The bidding or matching engine may be configured to run on one or servers 272 or peer-to-peer between device 242 and 256. The task or project may be crowdsourced or assigned by one or more servers 272 to multiple personal service or trade service providers.

In the case of a plumbing repair, for example, a junior and a master plumber may be teamed together to control device 242 to diagnose a problem for $200. The junior and master plumber may be matched based on location, customer ratings, most competitive bid, earliest availability, or the like to the plumbing repair or inspection.

Displayed pipe or object 264 on device 256 may correspond to pipe or object 243. When working on a project or task, device 242 may be configured to focus components A or C by device 256 on areas 244 or 246. Once tests or evaluations are complete on area 244, indicator 262 may display "OK" on device 256 if pipe or object 264 is operating properly. Once tests or evaluations are complete on area 246, indicator 260 may display "X" on device 256 if there is a problem with pipe or object 264. These results may subsequently be reported to device 242.

Figure 3:
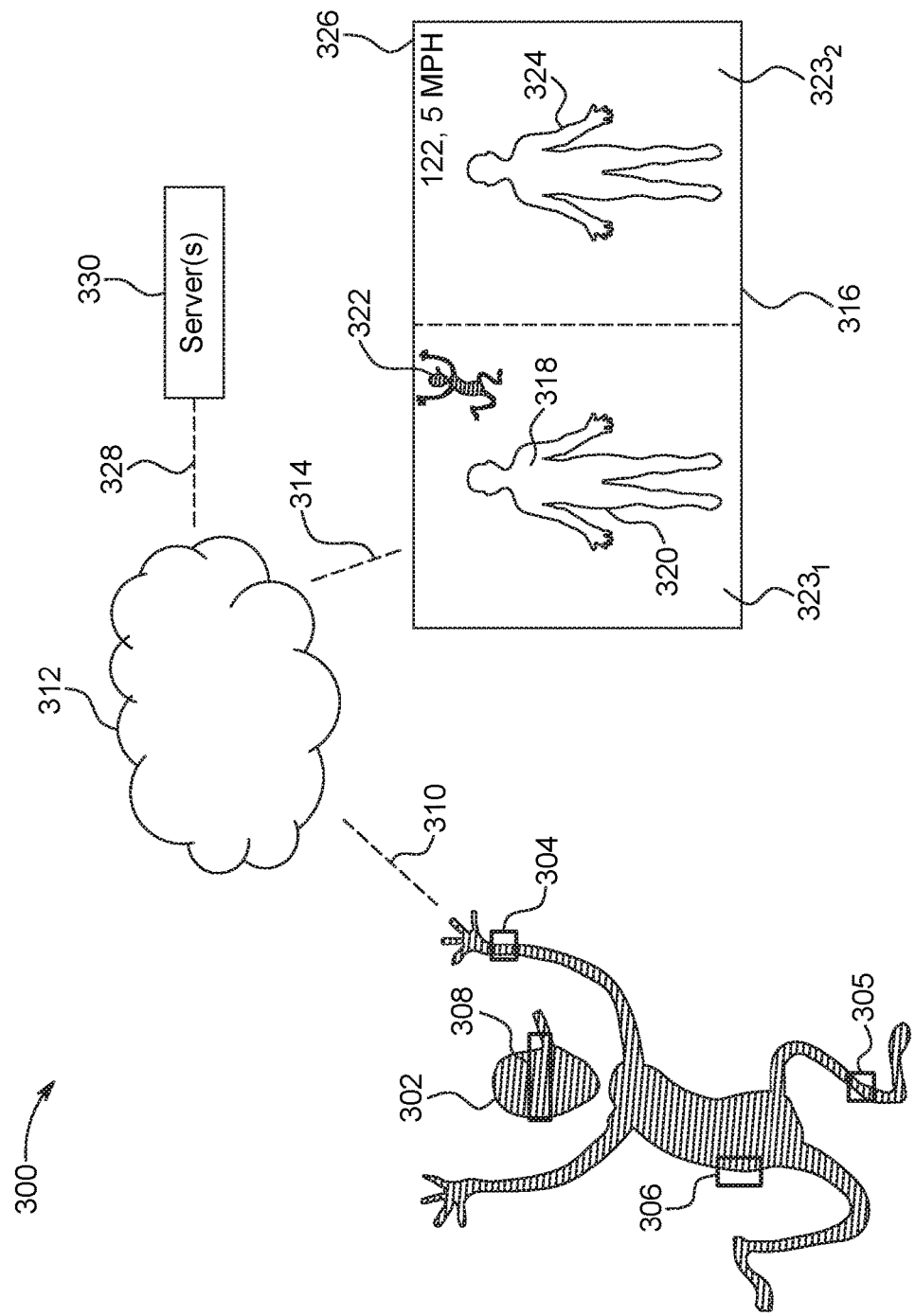
FIG. 3 is a diagram showing another example of remotely providing personal services.

FIG. 3 is a diagram showing another example of remotely providing personal services in configuration 300. In FIG. 3, remote aerobics, exercise, training, or like may be provided to subject 302 by a personal trainer or coach via device 316. Devices 304-306, 308, and 316 may communicate over network 312 via wireless or wired links 310 or 314 to provide these services. One or more servers 330 may also coordinate, facilitate, or manage subject 302 over wired or wireless links 328 via network 312 to provide services.

Subject 302 may be part of a real-time or just-in-time virtual classroom or class remotely provided by a user of device 316 (or device 316 itself). The form of subject 302 may be monitored, tracked, or modeled by devices 304-306 or 308. Devices 304-306 may be, for example, a smartphone, an object device, an electronic device, a wireless subscriber unit, a mobile device, an user equipment (UE), a mobile station, pager, mobile computer, cellular phone, cellular telephone, telephone, personal digital assistant (PDA), computing device, sensor, personal computer (PC), a digital music player, peripheral, video game device, a wearable computer, or the like. In addition, device 304, 305, or 306 may be configured, in part, as object device 100.

Device 304, 305, or 306 may be worn on selective body parts such that they may coordinate to capture, estimate, model, or determine the precise body motion or form of subject 302. This may be done, for example, using one or more sensors 126 in device 304, 305, or 306. For instance, software on device 306 may use data from an accelerometer, gyroscope, or GPS device to determine that a user is running. This may be determined, for instance, by measuring the momentum, orientation, and change in position of subject 302 by any one of sensors 126.

Device 304 may subsequently estimate arm motions based on a library of typical arm motions used during a run and provide that information to device 316. Device 305 may estimate leg motions based on a library of typical leg motions used during a run and provide that information to device 316. Arm or leg motions may be determined by a software engine based on data from an accelerometer, gyroscope, sensor, or the like. Examples of motions may include swinging, flailing, circular, partial circular, vertical, horizontal, axial, lifting, lifting weights swaying, punching, raising, cross body, kicking, stepping, hopping, jumping, tilting, arm gestures, leg gestures, full body gestures, or the like.

Different head, body, arm, or leg motions may be determined using the orientation data from a gyroscope and momentum data from an accelerometer in one device attached to a body part versus the orientation data from a gyroscope and momentum data from an accelerometer in another device attached to another body part. For instance, device 308 may be configured as a Bluetooth headset that shares sensor data with device 304, such as over a Bluetooth connection, to help track the motion of subject 302's arm. Device 308 may also be configured to function as a point of reference for device 304.

Moreover, motion vectors of device 304, representing one of subject 302's arm, may be determined by estimating the distance between device 304 and 308 and combined with momentum and orientation estimates of subject's 302 arm by device 304. A distance between devices 304 and 308 may be estimated based on signal attenuation of a Bluetooth test signal communicated between the devices.

In addition, device 308 may also be used to monitor, track, or model the form or performance of subject 302 by device 316. Device 308 may be virtual reality glasses, head-mounted display (HMD), helmet mounted display (HMD), glasses, goggles, optical head-mounted display (OHMD), or the like. Device 308 may be configured, in part, as object device 100. Device 308 may coordinate with devices 304 or 306 to estimate or determine the head motion of subject 308 and provide that information to device 316. Devices 304-306 and 308 may share data via local connections, such as Bluetooth or Wi-Fi direct, or via network 312. Devices 304-306 and 308 may also share data and communicate via one or more servers 330.

In addition, device 308 may be configured to scramble/jam any video or photo that may be attempted to be captured by other mobile devices to maintain the privacy of subject 302. This may be performed by device 308 being configured as an earpiece, HUD, earring, Bluetooth™ earpiece, or the like that uses an IR or LED device to emit non-visible light or infrared signal. This may jam a viewing complementary metal-oxide-semiconductor (CMOS) or charge-coupled device (CCD) camera sensor by blurring an image of subject 302.

Once head, arm, leg, or any other body part motion is estimated, modeled, or determined, device 316 may provide visual, auditory, sensory, and/or haptic feedback to subject 302 via device 304-306, or 308. For instance, if a runner's stride is too long, auditory and/or haptic feedback may be given to help subject 302 shorten stride length. The feedback may be a vibration to subject's body part, such as to the hip (by device 306), arm (by device 304), or leg (by device 305). The vibration may continue until the subject's stride is optimal for a particular type of run, runner, course, or the like. The intensity of the vibration may be high if the stride determined by devices 304-306 is out of a particular normal range. The intensity of the vibration feedback may lessen with each stride the runner gets to an optimal stride.

Device 304 may monitor the hand or arm movement of subject 302 via one or more sensors 126. The motion or form of subject 302 may optionally be shown on device 316 via displayed graphic 322 in view $323_1$. Anatomy graphic 320 may show vitals, statistics, or any other metric for subject 302. For example, heart rate may be indicated by 318. For privacy reasons, anatomy graphic 324 may be displayed in view $323_2$ for a personal trainer to monitor subject 302. Statistics 326 may be displayed to provide heart rate and speed of subject 302. In addition, wire frame graphics may be used to model the motion or form of subject 302 to be displayed on views $323_1$ or $323_2$. Wire frame modeling may be desirable since sometimes only rough motions or form of subject 302 may be determined using devices 304-306 or 308.

Still referring to FIG. 3, personal bodyguard services may be provided by configuration 300. A security application running on devices 304-306, and/or 308 may determine physical distress based on estimated arm, legs, or body positions or motions. This may be performed by using one or more sensors 126 on devices 304-306, and/or 308. Moreover, a scrambled audio feed may be provided to device 316 whereby distress is determined using a voice, speech, or audio recognition engine on device 316. A scrambled audio feed may be provided to protect the privacy of subject 302. Voice, speech, or audio recognition engines are described in U.S. Patent Publication Nos. 2013-0096915, 2012-0290299, or 2012-0215543 and U.S. Pat. Nos. 8,219,397 or 7,680,661 all herein incorporated by reference as if fully set forth.

Again referring to FIG. 3, an environmental preference of a room, crowdpreferencing, may be determined by collecting or crowdsourcing local data. When subject 302 enters a room, device 304-306, or 308 may provide environmental preferences to a smart room system. The smart room system may be provided via a software engine on one or more servers 330 via network 312. The smart room system may process the preferences of multiple subjects, including 302, in a room at a given period of time to dynamically adjust preferences based on the average preference data of the subjects in the room.

Preferences may include temperature, brightness of lights, volume, brightness of projector/screen, or the like. Moreover, preferences may include music selections, a play list for a concert, food/drink menu selections for a restaurant, drink specials for the night, or the like to optimize a room or experience. Moreover, future preferences may be crowdsourced. For instance, once a ticket is bought for an event, preferences of subject 302 may be automatically sent to the smart room system engine running on one or more servers 330 via network 312. This may give an establishment time to customize an experience or event to its audience. Put in another context, device 304-306, or 308 may predict where subject 302 is heading, and automatically send preferences in advance of arrival to a location.

Figure 4:
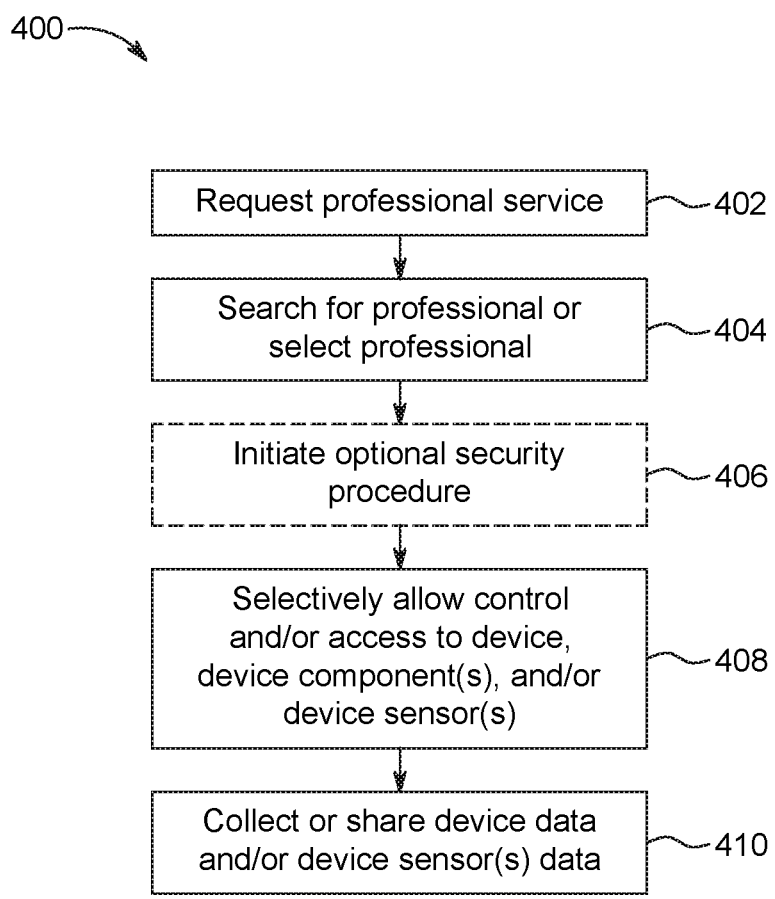
FIG. 4 is an exemplary process for remotely providing professional or personal services.

FIG. 4 is an exemplary process 400 for remotely providing professional or personal services. A request for a professional service may be performed via a network from one device to another device having a personal service provider available on demand on the another device (402). A search may be performed for the best professional or a professional may be selected using a criteria (404). An optional security procedure may be performed (406) between devices via the network. Control and/or access to device, device component(s), and/or device sensor(s) on one device may be selectively allowed to another device and personal service provider (408) via the network. Device data and/or device sensor(s) data is collected or shared to another device and personal service provider (410) via the network in order to provider a personalized service.

Figure 5:
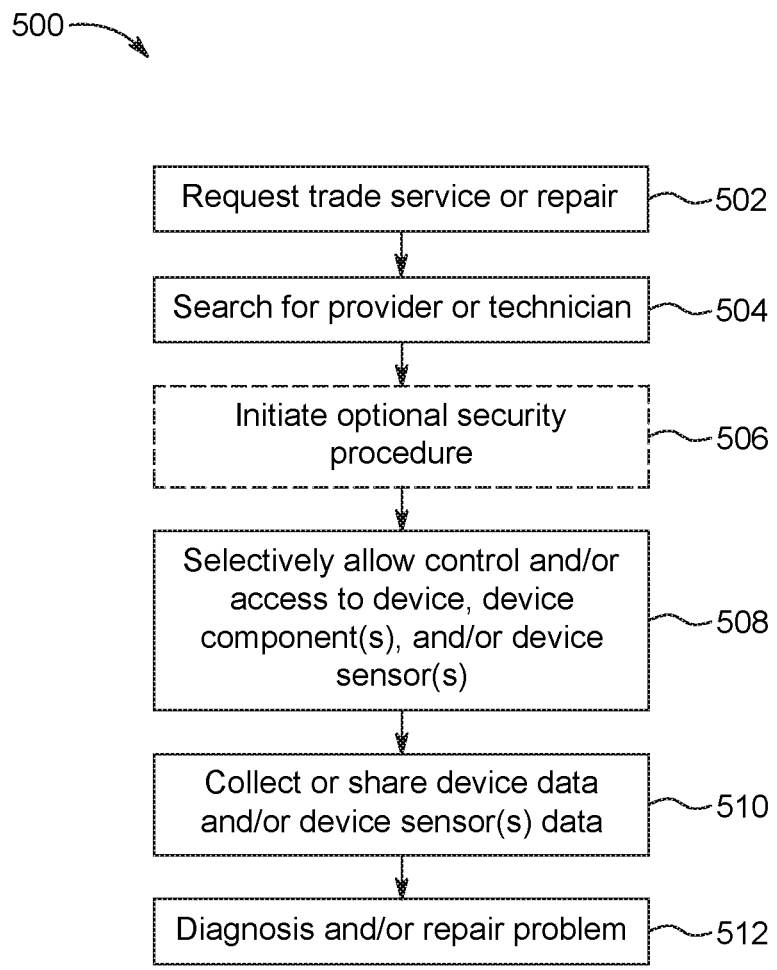
FIG. 5 is an exemplary process for remotely providing personal or trade services.

FIG. 5 is an exemplary process 500 for remotely providing personal or trade services. A request for a trade service or repair may be performed via a network from one device to another device having a trade service provider available on demand on the another device (502). A search may be performed for the best provider or technician (504). This search may be performed using a criteria. An optional security procedure may be performed (506) between devices via the network. Control and/or access to device, device component(s), and/or device sensor(s) on one device may be selectively allowed to another device and trade service provider via the network (508). Device data and/or device sensor(s) data is collected or shared to another device and trade service provider (510) via the network. A problem may be diagnosed, repaired, confirmed, ruled-out, or the like using the device data and/or device sensor(s) data (512) from a remote device by a trade service provider and/or a device used by a trader service provider via the network. Also, instead of working on a problem, an object may be inspected and certified as working properly using the device data and/or device sensor(s) data from a remote device by a trade service provider and/or a device used by a trader service provider via the network.

Figure 6:
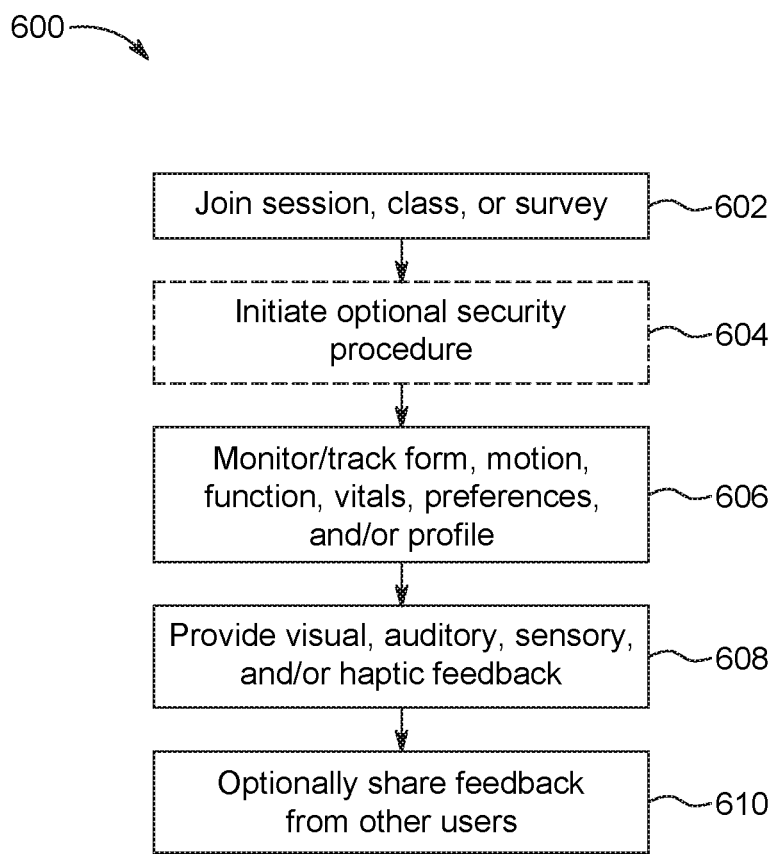
FIG. 6 is an exemplary process for remotely providing personal services.

FIG. 6 is an exemplary process 600 for remotely providing personal services. A user may join a session, class, online survey, etc. (602). An optional security procedure may be performed (604) between devices. Form, motion, function, vitals, preferences, or a profile of a user of at least one device may be monitored or tracked (606). Visual, auditory, sensory, and/or haptic feedback may be provided to one user from another remote user in order to train, coach, or help the user remotely (608). The data of the user may optionally be shared to other users or a crowd for feedback (610).

Although features and elements are described above in particular combinations, each feature or element may be used alone without the other features and elements or in various combinations with or without other features and elements. The methods, processes, or flow charts provided herein may be implemented in a computer program, software, or firmware incorporated in a computer-readable storage medium for execution by a general purpose computer, a processor, or a controller. Examples of computer-readable storage mediums include a read only memory (ROM), electrical signals, a random access memory (RAM), a register, cache memory, semiconductor memory devices, magnetic media such as internal hard disks and removable disks, magneto-optical media, and optical media such as CD-ROM disks, digital versatile disks (DVDs), and BluRay discs.

Suitable processors include, by way of example, a general purpose processor, a multicore processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement hardware functions for use in a computer, or any host computer. The programmed hardware functions may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

Any of the displays, processors, memories, devices or any other component disclosed may be configured, produced, or engineered using nanotechnology based nanoparticles or nanodevices.

What is claimed is:

1. A mobile electronic device comprising:
    circuitry configured to send, via a network, a request for assistance with taking a photo for the mobile electronic device by a remote camera service component on a remote device;
    circuitry configured to establish a connection, via the network, with the remote camera service component on the remote device;
    circuitry configured to facilitate selective shared control, to the remote device via the network, of a subset of sensor components of the mobile electronic device to adjust a shutter speed, a flash setting, and a filter setting prior to taking the photo, wherein the photo is taken from the remote camera service component based on a shared view of objects in the photo, the photo is stored by the remote device on a server associated with the mobile electronic device, and selective shared control expires after the taking of the photo; and
    wherein the adjustment is made based on transmitted accelerometer data and gyroscope data of the mobile electronic device processed by a motion recognition engine.

2. The mobile electronic device of claim 1 further comprising:
    the circuitry further configured to send, via the network, user defined preferences to a computer that controls an environment of a room when the mobile electronic device is in the room; and
    wherein the computer adjusts, when the mobile electronic device is in the room, the environment of the room based on an average of the user defined preferences set on the mobile electronic device.

3. A method performed by an mobile electronic device, the method comprising:
    sending, by the mobile electronic device via a network, a request for assistance with taking a photo for the mobile electronic device by a remote camera service component on a remote device;
    establishing, by the mobile electronic device via the network, a connection with the remote camera service component on the remote device;
    facilitating selective shared control, by the mobile electronic device to the remote device via the network, of a subset of sensor components of the mobile electronic device to adjust a shutter speed, a flash setting, and a filter setting prior to taking the photo, wherein the photo is taken from the remote camera service component based on a shared view of objects in the photo, the photo is stored by the remote device on a server associated with the mobile electronic device, and selective shared control expires after the taking of the photo; and wherein the adjustment is made based on transmitted accelerometer data and gyroscope data of the mobile electronic device processed by a motion recognition engine.

4. The method of claim 3 further comprising:

sending, by the mobile electronic device via the network, user defined preferences to a computer that controls an environment of a room when the mobile electronic device is in the room; and wherein the computer adjusts, when the mobile electronic device is in the room, the environment of the room based on an average of the user defined preferences set on the mobile electronic device.

\* \* \* \* \*